Nov. 6, 1956     K. NEUFFER     2,769,674
ROLLER BEARINGS
Filed Aug. 29, 1952
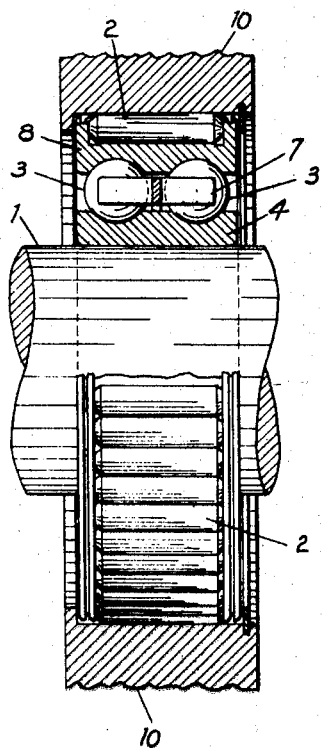
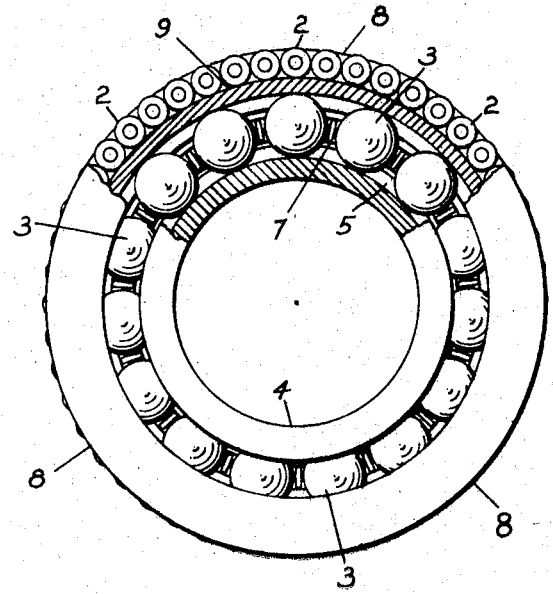
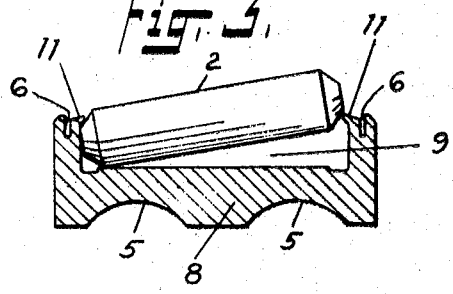
Karl Neuffer INVENTOR.
BY *[signature]*
ATTORNEY

United States Patent Office 2,769,674
Patented Nov. 6, 1956

2,769,674
ROLLER BEARINGS
Karl Neuffer, Kouts, Ind.

Application August 29, 1952, Serial No. 307,046

2 Claims. (Cl. 308—183)

My invention relates to improvement in roller bearings and it includes the features described in the accompanying description and claims as shown on the accompanying drawing.

This application is a continuation-in-part of application Serial No. 3,524, filed January 21, 1948, now abandoned.

The purpose of my invention is to provide a concentric roller bearing which comprises inner and outer roller raceways with small diameter rollers therebetween, and inner and outer ball raceways with balls therebetween. The outer roller raceway is formed in a housing and is provided with radially extending means to limit the axial movement of the bearing. The inner ball raceway is shrink fitted on a shaft.

With these and other related ends in view I illustrate on the accompanying drawing such instances of adaptation as will disclose the broad features of the invention without limiting myself to the specific details shown and described herein:

Figure 1 is an elevational view, partly in section, showing the bearing assembly associated with a shaft and a support;

Figure 2 is a front elevation showing part of the structure illustrated in Figure 1; and Figure 3 is an enlarged partial view showing the manner of assembling the rollers of the bearing assembly with a ring.

In practicing my invention I may make such changes in the structure as the exigencies of varying conditions may demand without departing from the broad spirit of the invention.

The bearing assembly is mounted on a shaft 1 and includes an external group of rollers 2 and interior groups of balls 3. An inner ring or sleeve 4 is shrunk or otherwise fastened to the shaft and its outer portion is provided with grooves receiving the balls. The balls are preferably held in place by retaining means 7.

The bearing assembly also includes an outer ring 8. The outer portion of this ring is provided with a raceway 9 which receives the rollers and its inner portion is provided with grooves 5 which substantially correspond to the grooves in the inner ring and receive the balls. The bearing assembly is associated with a support or housing 10 with the rollers bearing thereagainst as depicted in Figure 1.

The rollers 2 are small in diameter and of relatively short length. The raceway 9 for the rollers 2 has a retaining flange 11 on each side of the raceway 9.

There are a large number of rollers 2 and a smaller number of balls 3 of relatively larger diameter than the rollers. The structure is exceedingly simple and easily assembled. The components retain their operative relationship throughout the entire life of the bearing assembly.

By reason of having the group of rollers in a raceway 9 of a large diameter enables one to use a number of identical rollers. The rollers withstand all the strain that the rotation of the shaft 1 produces. The rollers 2 are substantially equally spaced throughout the circumference of the raceway in the housing, without crowding.

The rollers are assembled loosely in the raceway to completely fill the circumference except the space occupied by the last roller which is snapped into place between the flanges.

If found desirable, the bearing assembly may be constructed so that the rollers may be used without including inner groups of balls.

By reason of the small diameter of the rollers the rotative strains are distributed over a large number of rollers thus insuring longer service than if dependence were placed upon a few large diameter rollers. The drive shaft is maintained centrally of the roller raceways by reason of the radial construction between the raceways and the shaft.

The bearing assembly offers the advantage that any suitable lubricant will be equally distributed about the relatively movable components of the assembly and the rollers by reason of their small diameters assist in distributing the strains over greater areas of the assembly, thereby producing smooth and stable actions notably different from a setup where only a few rollers of larger diameters are employed.

The two flanges 11, of the roller raceway face each other and overhang slightly to engage the beveled or curved ends of the rollers 2. In order that these flanges may have a degree of elasticity toward and away from each other a narrow radial groove 6 is cut in the side walls of the outer ring 8. It will be noted that the rollers extend outwardly from the raceway 9 and beyond the retaining flanges 11 for rolling engagement with the housing 10.

What I claim is:

1. In combination: a support provided with an opening defining an internal raceway having an axially extending cylindrical surface, an outer race ring disposed within the confines of the opening, said ring comprising a one-piece body provided with an external raceway defined by an annular axially extending base portion and a pair of substantially parallel outwardly extending radial side walls, the outer free marginal edge portions of the side walls having inturned corresponding flanges, roller bearings seated in and secured in said external raceway by said inturned flanges and engaging the cylindrical surface of said support, the inner side of the base portion of said ring being provided with a pair of corresponding parallel grooves, a one-piece inner race ring disposed within the confines of the outer race ring, the outer side of said inner race ring being provided with a pair of grooves substantially corresponding to the first mentioned pair of grooves, ball bearings seated in the pairs of grooves, and inwardly extending radial means carried by the support located on opposite sides of the side walls of the outer ring for limiting axial movement of the latter in the opening.

2. The structure defined in claim 1, including a shaft on which the inner race ring is shrink fitted for movement therewith, with annular retainer means disposed between the inner and outer race rings for spacing the ball bearings, and the axial lengths of the roller bearings and the axial extent of the ball bearings are sufficient to stabilize relative movement between the inner and outer race rings and the support.

References Cited in the file of this patent

UNITED STATES PATENTS

| 1,433,014 | Kennedy | Oct. 24, 1922 |
| 1,539,702 | Szuba | May 26, 1925 |
| 2,197,351 | Smith | Apr. 16, 1940 |
| 2,236,481 | Storz | Mar. 25, 1941 |
| 2,518,159 | Martin | Aug. 8, 1950 |

FOREIGN PATENTS

| 282,976 | Italy | Feb. 26, 1931 |
| 438,382 | Italy | Aug. 6, 1948 |
| 842,382 | France | June 12, 1939 |